(12) United States Patent
Mayer et al.

(10) Patent No.: US 9,202,373 B2
(45) Date of Patent: Dec. 1, 2015

(54) MICRO-DIFFRACTIVE SURVEILLANCE ILLUMINATOR

(75) Inventors: Tony Mayer, Burnaby (CA); Mark Vernon, Cramlington (GB)

(73) Assignee: BOSCH SECURITY SYSTEMS BV, Eindhoven (NL)

( * ) Notice: Subject to any disclaimer, the term of this patent is extended or adjusted under 35 U.S.C. 154(b) by 1779 days.

(21) Appl. No.: 11/997,394

(22) PCT Filed: Sep. 25, 2006

(86) PCT No.: PCT/CA2006/001570
§ 371 (c)(1),
(2), (4) Date: Jan. 30, 2008

(87) PCT Pub. No.: WO2008/037049
PCT Pub. Date: Apr. 3, 2008

(65) Prior Publication Data
US 2010/0097468 A1 Apr. 22, 2010

(51) Int. Cl.
*G08G 1/017* (2006.01)
*G02B 27/09* (2006.01)
*G08G 1/04* (2006.01)

(52) U.S. Cl.
CPC .......... *G08G 1/0175* (2013.01); *G02B 27/0911* (2013.01); *G02B 27/0944* (2013.01); *G08G 1/04* (2013.01)

(58) Field of Classification Search
None
See application file for complete search history.

(56) References Cited

U.S. PATENT DOCUMENTS

| | | | |
|---|---|---|---|
| 5,926,257 A | 7/1999 | Mizouchi | |
| 6,628,370 B1 * | 9/2003 | McCullough et al. | 355/53 |
| 6,959,870 B2 * | 11/2005 | Tsikos et al. | 235/462.1 |
| 2003/0174865 A1 * | 9/2003 | Vernon | 382/105 |
| 2006/0007791 A1 * | 1/2006 | Bamdad | 369/13.53 |
| 2006/0139637 A1 * | 6/2006 | Cho et al. | 356/328 |
| 2007/0121085 A1 * | 5/2007 | Dewald | 353/99 |
| 2008/0298066 A1 * | 12/2008 | Van De Voorde et al. | 362/264 |

FOREIGN PATENT DOCUMENTS

| | | |
|---|---|---|
| JP | 2006-024378 | 1/2006 |
| WO | WO 92/03808 | 3/1992 |
| WO | WO 01/39153 A1 | 5/2001 |

OTHER PUBLICATIONS

Wang et al., Diffractive Optics: Nanoimprint Lithography Enables Fabriation, Dec. 1, 2005, Laser Focus World.*

* cited by examiner

*Primary Examiner* — Nicholas Taylor
*Assistant Examiner* — Clayton R Williams

(57) ABSTRACT

An active infra-red surveillance illuminator uses a statistically mono-directional micro-diffractive material overlaid on a bank of light emitting diodes (LEDs) to refract light from the LEDs onto a target image. This delivers energy distribution profiles out to a distance to match the aspect ratios of current wide-angle target and wide-angle camera surveillance systems. The distribution of refracted light is elliptical. This distribution can vary by using different diffractive material in conjunction with various numbers, brightness and angles of the LEDs in an LED bank. The effective range of the illuminators is greatly extended with this type of illumination. By limiting infrared (IR) radiation down to a 10 degree vertical window it renders the IR illumination much more effective for surveillance imaging by providing much more effective power on wide, ground-level scenes, and particularly enables multi-lane license plate capture.

34 Claims, 11 Drawing Sheets

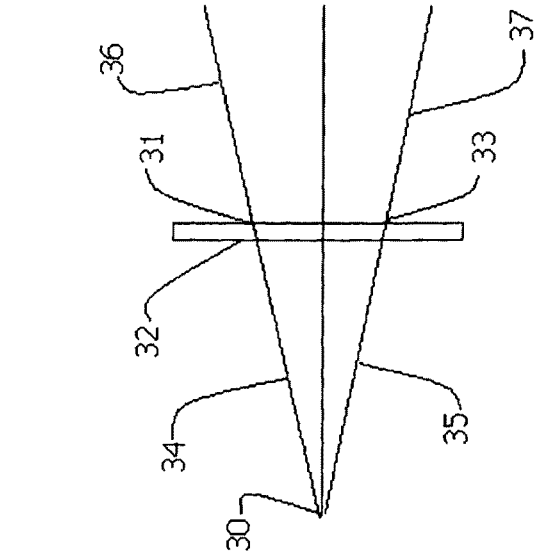
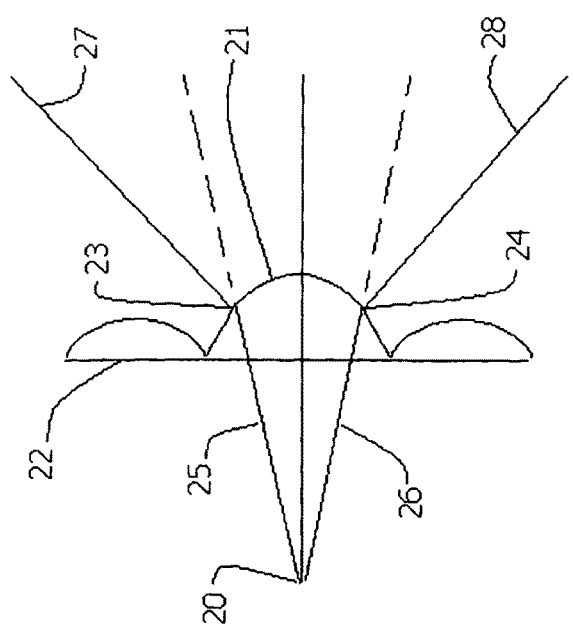

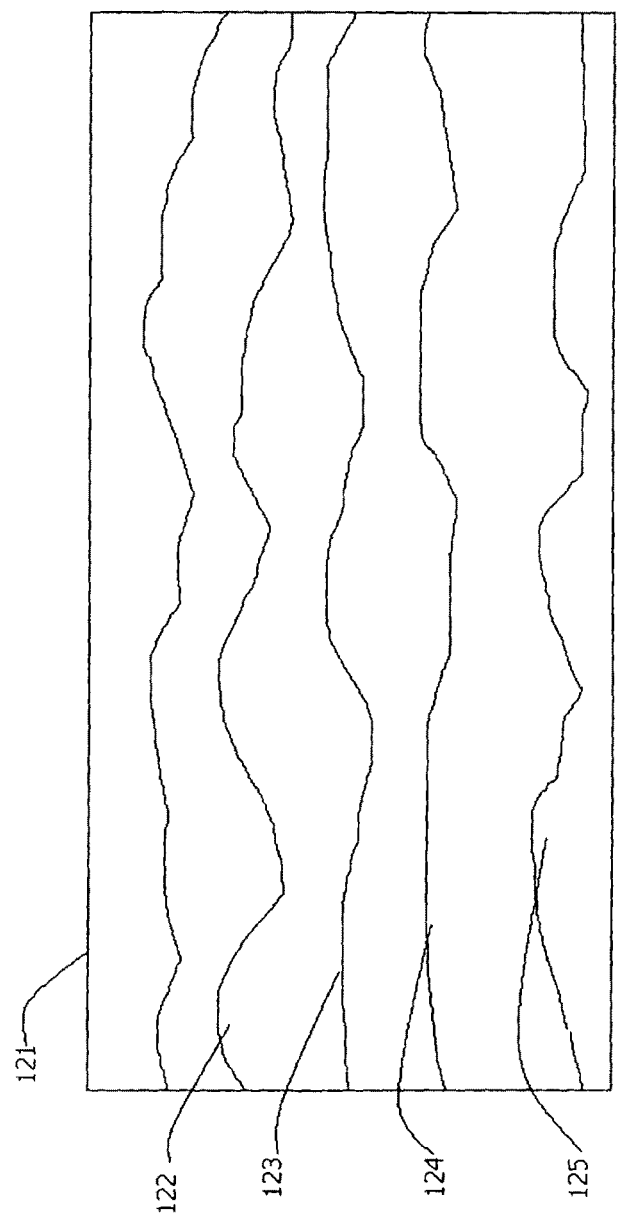

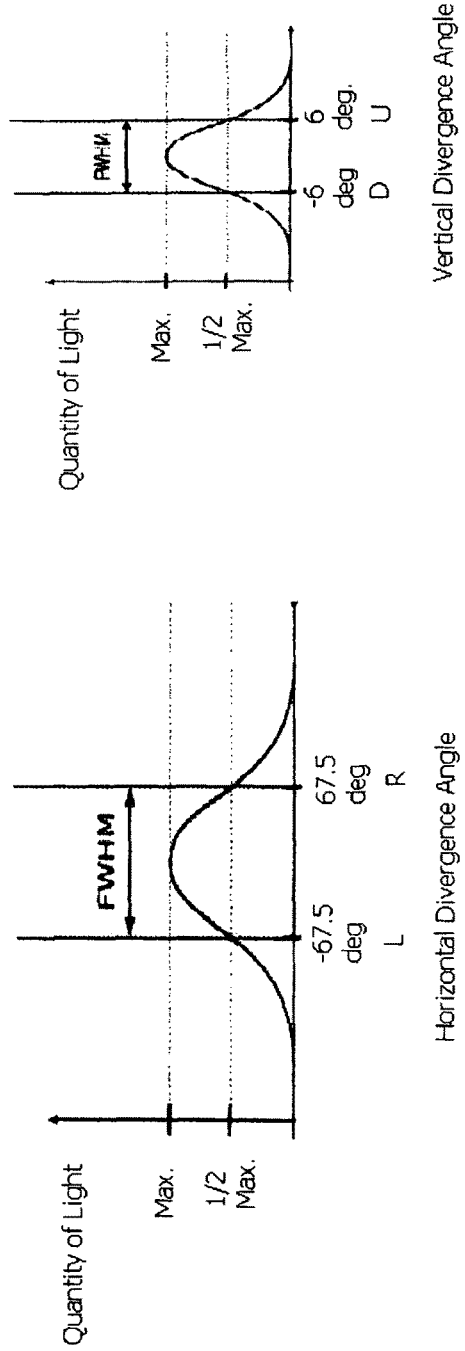

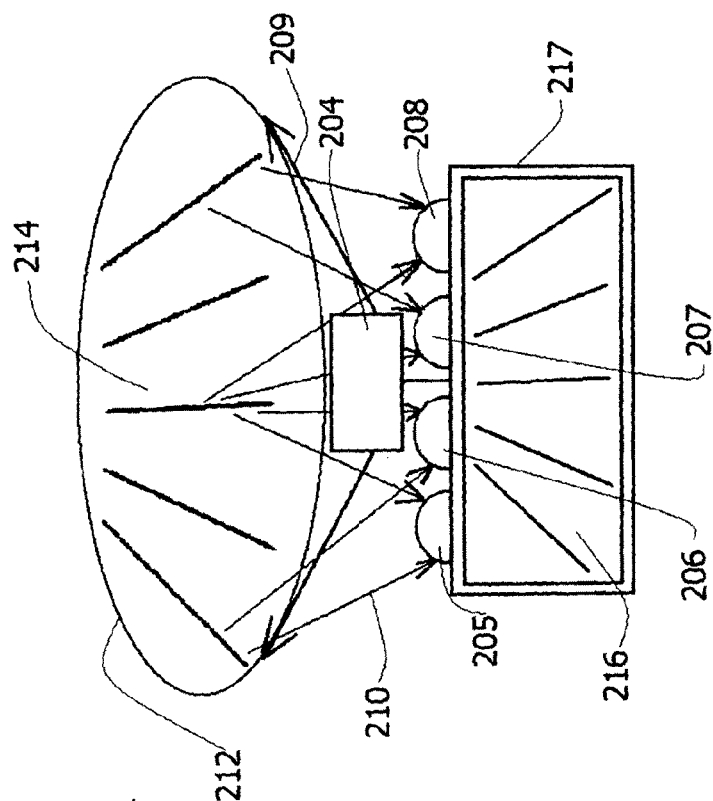
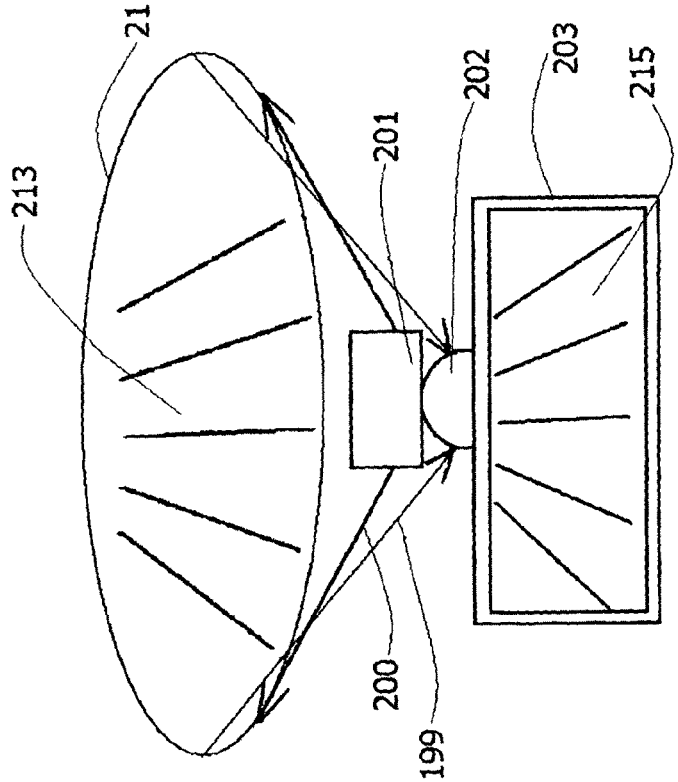
Figure 11 A
Figure 11B

MICRO-DIFFRACTIVE SURVEILLANCE ILLUMINATOR

FIELD OF THE INVENTION

This invention relates to the field of infra-red illumination for low-light video surveillance, and to the application of refractor technology, in particular micro-diffractive engineered material. It also relates to wide-angle video surveillance for such as multi-lane traffic license plate reading.

BACKGROUND

Due to the inverse square law of illumination, the intensity of light falling on a target area decreases in proportion with the square of the distance. When using a camera and lens arrangement to view a typical surveillance scene a certain proportion of the image contains the foreground and a certain amount the background. The amount of light required or optimal to illuminate the foreground of a target area is usually much lower than that required to illuminate the background of a target area. Additionally target areas in surveillance are typically more extended horizontally than vertically, because most target areas are based on a horizontal ground area, across which peoples or vehicles travel.

Most illumination systems produce a circularly diverging beam which when used with a camera, which requires the installer to point the peak of the beam at the farthest target point. For a fixed target distance there is an optimum beam profile in the vertical orientation. When viewing at the same distance with a wider and wider view and matching the circular illumination the illuminator moves further away from the optimum in the vertical orientation and wastes more light. Moreover, as the peak of the light source is pointed above the line of the target, a large proportion of the light is above the target area and is not utilized.

There are many systems which use infrared illumination for low light photography or video photography. There are also many systems which use LEDs for photographic or video illumination. Some of these systems utilize refractive or reflective elements to diffuse or focus illumination.

Illuminators using LEDs with refractive or reflective elements to enhance illumination are varied and include a number of different types of refractors which channel light from the LEDs so as to alter the distribution of illumination on the target and/or to make illumination more efficient by conserving light.

There are also a number of devices in which lights are fitted with micro-prisms or similar constructions to refract light onto a target. Some of these devices are used in projectors or similar systems or in media effects systems for backlighting.

Several necessities prior to this invention have combined to limit the technology of low light illumination for wide-angle nighttime surveillance video photography, particularly for license plate capture and reading, when several vehicles' headlights may be pointed toward a surveillance camera. There is a need to pulse the surveillance illumination to conserve energy. There is a need to synchronize a surveillance camera to the pulsed illumination returning to the camera after having fallen on a moving target. There is a need to illuminate a wide area in the case of vehicles traveling across lanes or where multiple lanes of vehicles are targeted. There is a need for wide-angle effective illumination matching wide-angle high pixel density cameras in order to capture tiny fast-moving license plates out of a large wide-angle scene such as a multi-lane freeway.

SUMMARY OF THE INVENTION

The present invention provides a surveillance illuminator system in which a micro-diffractive material comprising is placed in front of a light-emitting manifold such as a bank of infra-red LEDs to alter the shape of illumination on a target area for wide-angle surveillance under low light conditions. The illumination field produced has an elliptical Gaussian shape. The illuminator is designed to be used in connection with a wide-angle surveillance camera having an aspect ratio sensitivity matching the light pattern produced by the illuminator. This novel combination represents a breakthrough for the quality of background illumination for surveillance and nighttime video and photography as it results in wide illumination patterns without moving away from the optimum vertical profile.

This invention results in the ability to produce an asymmetrical illumination pattern enabling increased sensitivity for wide area photographic or video coverage, such as wide-angle views of multi-lane traffic; optimization of the vertical spread of illumination under the cosecant squared distribution for more efficient background illumination; in the reduction in the number of LEDs which would normally be used for a new angle configuration; and in reduced light pollution including non-visible light pollution.

This invention is useful in an intelligently secured transportation system, in which surveillance of a multi-lane roadway is performed with a mega-pixel camera having a wide-angle aspect, in conjunction with a mega-wide monitor. The surveillance illuminator system of the present invention provides less light where it is unneeded in the top or bottom of the field of view and more light in an extended central area. The surveillance illuminator system therefore conserves power. It enables the available power and heat dissipation characteristics of the illuminator system's light source to effectively illuminate the wide-angle horizontal problem area. Less light overall is thereby needed to achieve ultra-high quality image capture of small target sub-sections of the scene because the light is more efficiently focused on the target sub-sections by the micro-diffractive material.

The invention provides a surveillance illuminator system in which a micro-diffractive material that is "mono-directional" in that is statistically more directional for light in a first plane of output than in another output plane, such as in a horizontal output plane than in a vertical output plane, is mounted in front of a light-emitting manifold comprising a plurality of light sources, such as a planar array of light-emitting diodes (LEDs) array emitting light having a wavelength of approximately 850 nanometers, in the infrared range from 700 to 1000 nanometers. In an especially efficient embodiment, the system has a surveillance camera having an aspect ratio sensitivity substantially matching a light pattern projected by the mono-directional micro-diffractive material mounted in front of the light-emitting manifold.

This invention may employ a double layer of the micro-diffractive material which combines horizontal and vertical sets of material to produce different asymmetrical combinations from a smaller subset of lens shapes and in some combinations may extend the maximum angle of diffraction.

This invention can also use different micro-diffractive material above the mid-line of the illuminator than below may allow an asymmetrical vertical beam profile which enables more efficient use of the light resulting in increased illumination distances.

The invention thus provides significantly increased usable distance from prior illuminators, for example 110 meters compared to 54 meters for a light source comprising LED's having a 60 degree angle of light dispersion before micro-diffraction. The foreground/background ratio of illumination is also much more even with the present invention, making for a significantly better image because the camera needn't try to adjust the exposure to the foreground; it is able to make better use of the light on the target scene.

BRIEF DESCRIPTION OF THE DRAWINGS

FIG. 2A is a horizontal cross-sectional view of the mono-directional micro-diffractive material.

FIG. 2B is a vertical cross-sectional view of the mono-directional micro-diffractive material.

FIG. 3 shows the structure of the micro-diffractive material under high magnification

FIG. 9A plots the distribution function of light emitted by the illuminator in terms of quantity of light and horizontal divergence angle. The full width-at half maximum (FWHM) of the function is shown.

FIG. 9B plots the distribution of light emitted by the illuminator in terms of quantity of light and vertical divergence angle. The full width-at half maximum (FWHM) of the function is shown.

FIG. 11A shows a four lane roadway scene illuminated by the micro-diffractive light emitting manifold illuminator and the same scene captured by a wide-angle CCTV camera and displayed on a wide-angle monitor.

FIG. 11B shows a four lane roadway scene illuminated by the micro-diffractive light emitting manifold illuminator and captured two lanes at a time by four CCTV video cameras. The integrated image is displayed on a wide-angle monitor.

DETAILED DESCRIPTION

Figure 1B:
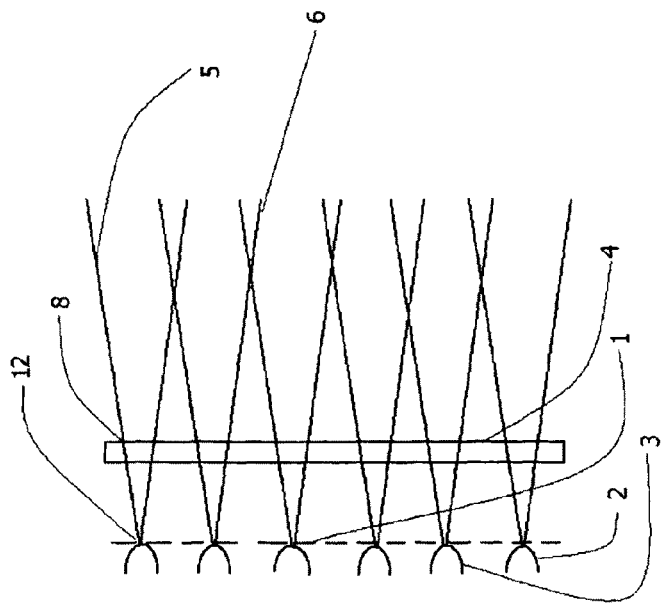
FIG. 1B is a side view of the section of the illuminator showing light rays from the light emitting manifold traveling through the mono-directional micro-diffractive material with negligible vertical diffraction.
Figure 1A:
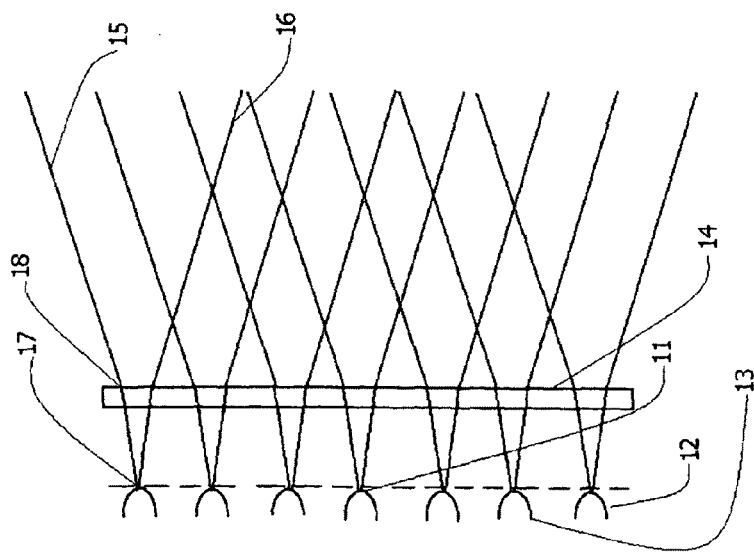
FIG. 1A is a top down view of a section of the illuminator showing light rays from the light emitting manifold traveling through the mono-directional micro-diffractive material and being diffracted horizontally.

Referring to FIG. 1A, the light emitting manifold 11 seen in a top down view, which contains a number of near point-source lights such as 12 and 13, sends rays of light such as 17 through a mono-directional micro-diffractive material 14 which causes the rays of light to diverge horizontally as at point 18, so that the outgoing light rays 15 and 16 travel out from the illuminator at greater angles.

Referring to FIG. 1B, the light emitting manifold 1 is seen in a side view, with point-source light 12 shown at the top, and point-source lights 2 & 3 which are below the visible plane of FIG. 1A. Light from the manifold 1 passes through the micro-diffractive material 4, but the mono-directional nature of the micro-diffractive material enables the light to pass through without significant vertical divergence as a point 8. The outgoing rays of light such as 5 and 6 continue close to their initial trajectories.

Referring to FIG. 2A, a beam of light from an LED 20 characterized by light rays 25 & 26 passes through a micro-diffractive lens 21 on a magnified horizontal cross-section of micro-diffractive sheet 22. The rays 25 & 26 are diffracted to greater incidence angles at points 23 and 24 on the micro-diffractive lens 21. The new trajectory of the rays is shown by 27 & 28 respectively as contrasted with the original path represented by dotted lines.

Referring to FIG. 2B, a beam of light from an LED 30 characterized by light rays 34 & 35 passes through a magnified vertical cross-section of the micro-diffractive sheet 32. The new trajectory of rays 34 & 35 is shown by 36 & 37 respectively to be very nearly identical to the original trajectory. This is due to the extreme flatness of the lens structure of the micro-diffractive sheet in the vertical dimension. At this level of magnification, no curvature can be seen to define a lens and no inflection is visible at points 31 & 33.

Referring to FIG. 3, a microscopic segment of the micro-diffractive material is shown, at very high magnification with nanoscopic refractive structures as at 122, 123, 124, & 125 that appear like waves. The length and relative flatness of the wave crests allows for less diffraction in the vertical plane than in the horizontal plane. The aligned nanoscopic structures cause the micro-diffractive sheet statistically to tend to refract light at a different angle in one plane such as a horizontal plane than in another plane perpendicular to the first, such as a vertical plane.

Figure 4:
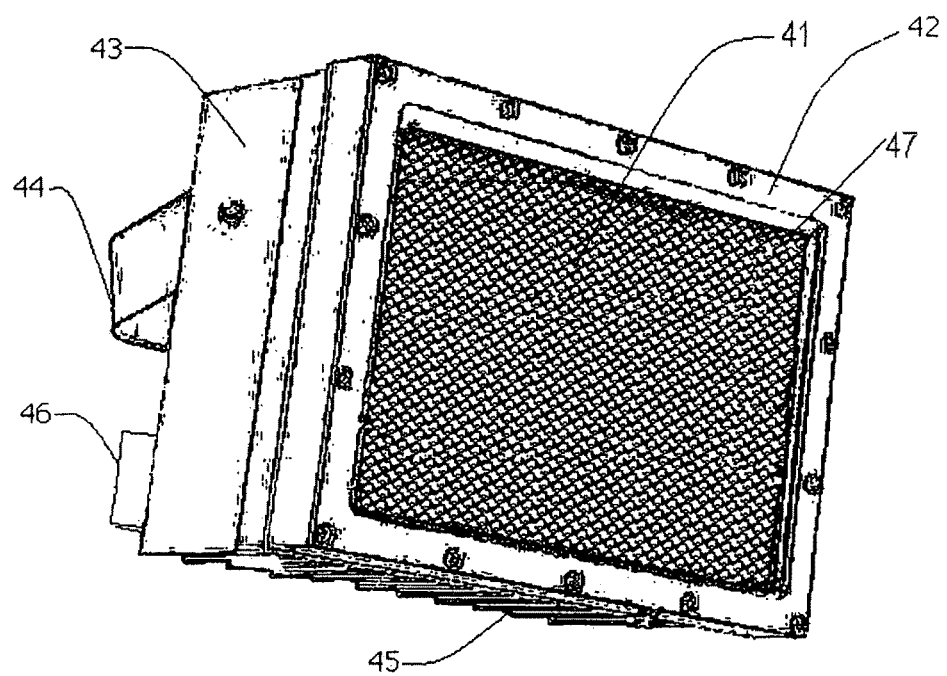
FIG. 4 is a perspective view of the rectangular LED array showing the heat sink and the constant current power source.
Figure 5:
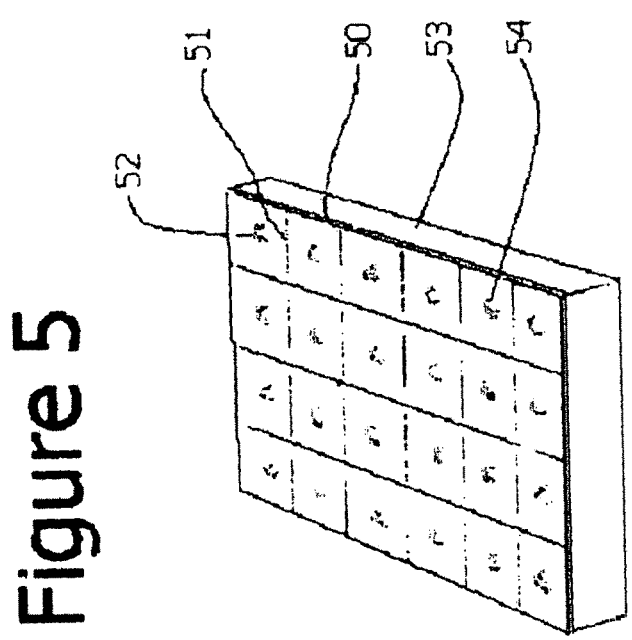
FIG. 5 is a perspective view of the mono-directional micro-diffractive material overlaid on the rectangular LED array.

Referring to FIG. 4, the rectangular LED array 41, is mounted on the illumination housing 43, within a frame 42. The housing 43 is equipped with a heat sink 45, and a constant current power source 46. It can be mounted with a bracket 44. The front window 47 for the light emitting manifold has optical filter properties that pass substantially all infrared light energy while blocking light at shorter wavelengths;

Referring to FIG. 5, a sheet composed of micro-diffractive material 50 is shown overlaying a small section of the LED array 51. LEDs such as 52 & 54 appear slightly blurred beneath the sheet of micro-diffractive material 50. The LED housing 53 contains the LED array 51.

Figure 6:
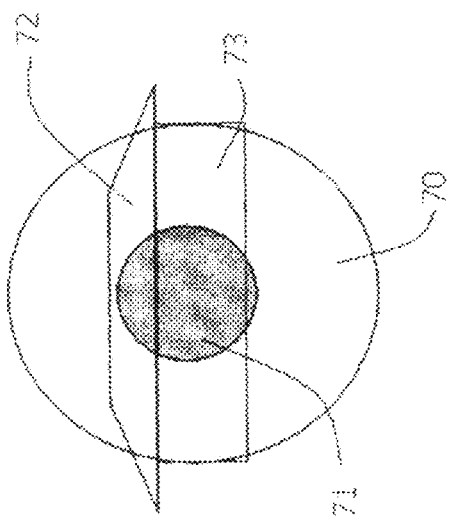
FIG. 6 is a view of the target image illuminated by a conventional infra-red illuminator. It illustrates how the power density for a circular beam pattern reduces as it gets wider to take in the extent of an asymmetrical target.

Referring to FIG. 6, the power density for a circular beam pattern 71 reduces as it gets wider to take in the extent of the asymmetrical targets 72 (house) and 73 (roof). The total power is divided over the area of the larger circle 70. Much of the power is then wasted above and below the target.

Figure 7:
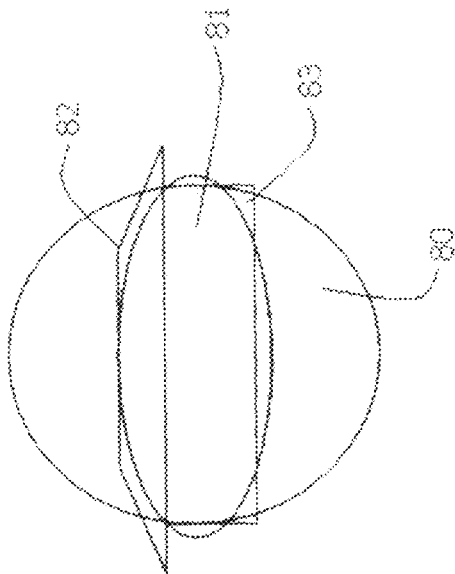
FIG. 7 is a view of the target image illuminated by the mono-directional micro-diffractive material rectangular LED array illuminator. It shows that using an elliptical or asymmetrical beam pattern there is practically no wasted light.

Referring to FIG. 7, in using an elliptical or asymmetrical beam pattern 81 there is practically no wasted light in the area where a circular beam 80 extends above and below the elliptical beam 81 while the beam illuminates wide targets such as roof 82 and house 83. This is very efficient use of the light available and thus can be used to increase the obtainable imaging distance or reduce the number of multiple illuminators that may be required for a particular application or reduce the size of illuminator required and decrease the electrical power required for a particular application.

Figure 8:
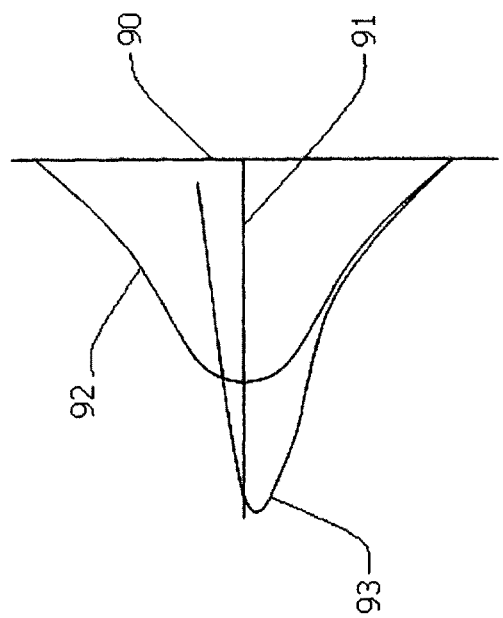
FIG. 8 shows another embodiment of this invention using different material above the mid line of the illuminator than below to allow an asymmetrical vertical beam profile.

Referring to FIG. 8, using different material above the mid line 91 of the illuminator than below allows an asymmetrical vertical beam profile 93. More efficient use of the light can be achieved resulting in increased illumination distances. A conventional illuminator would have a beam profile more like 92 with a much greater extent along the vertical axis 90.

Referring to FIG. 9A, the distribution of light emitted by the illuminator is plotted as a bell-shaped curve. On the vertical axis the quantity of light is shown against the horizontal divergence angle of the light from the illuminator on the horizontal axis. The full width-at half maximum (FWHM) of the function is shown between −67.5 and +67.5 indicating a significant horizontal divergence of 130 degrees of the light from the illuminator, the top of the curve being zero angle toward the center of the field of illumination.

Referring to FIG. 9B, the distribution of light emitted by the illuminator is plotted as a bell-shaped curve. On the vertical axis the quantity of light is shown against the vertical divergence angle of the light from the illuminator on the horizontal axis. The full width-at half maximum (FWHM) of the function is shown between 6 and 12 degrees, indicating a very low vertical divergence of the light from the illuminator.

Figure 10A:
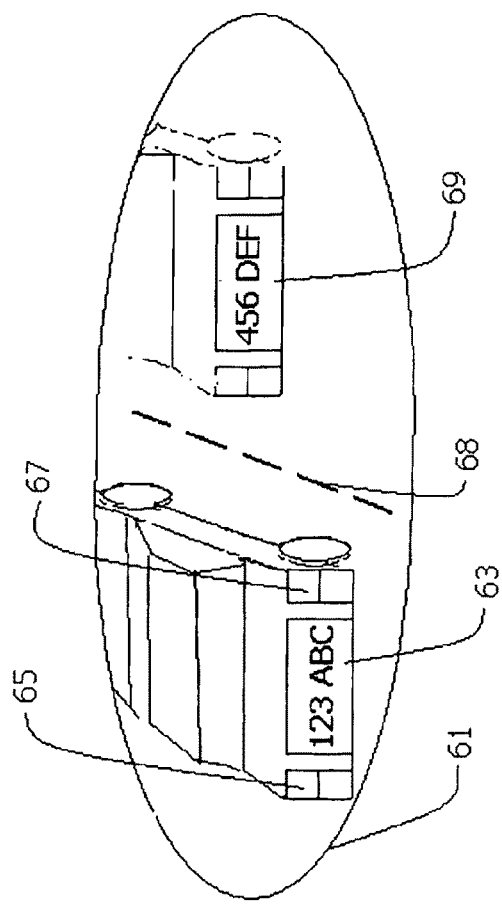
FIG. 10A shows a vehicle and its license plate illuminated by a conventional illuminator with a circular beam.

Referring to FIG. 10A, a target license plate 62 and reflectors 64 and 66 are illuminated by a conventional infrared beam 60. The images appear blurred due to insufficient concentration of light. This is a problem which arises because with a conventional illuminator, much light is wasted illuminating the background.

Figure 10B:
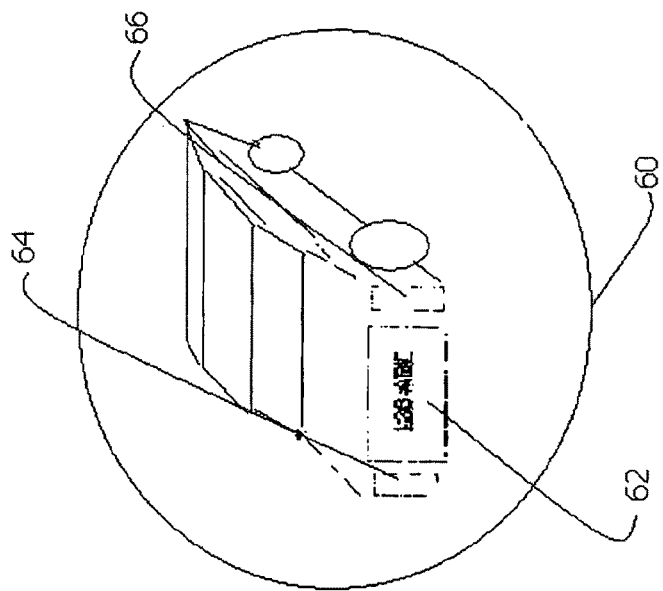
FIG. 10B shows two vehicles and their license plate illuminated with an illumination beam of similar area using the micro-diffractive light emitting manifold illuminator.

Referring to FIG. 10B, two lanes separated by dotted line 68 are illuminated by the wider beam 61 of the micro-diffractive surveillance illuminator. In the leftmost lane the target license plate 63 and reflectors 65 and 67 are all clearly illuminated by the concentrated elliptical illumination beam 61 produced by the light emitting manifold micro-diffractive illuminator. Due to the efficiency of the illumination beam a second target license plate 69 in the rightmost lane is also illuminated despite the fact that the total area and total power usage of the illumination beam in FIG. 10B is comparable to that in FIG. 10A. The micro-diffractive material is formed and arranged such that it projects an elliptical Gaussian distribution of refracted light, having a major axis of diffraction in the horizontal plane and a horizontal divergence in a range greater than double the angular divergence of the array of LEDs and a vertical divergence substantially unaffected by the micro-diffractive material. In the license plate application—the mono-directional micro diffractive material will allow multiple lanes to be covered with the same or less illumination compared to existing surveillance illuminator and camera systems by enabling the camera to make much better use of the illumination on scene.

Referring to FIG. 11A, the light emitting manifold micro-diffractive illuminator 201 is shown illuminating a scene 211 consisting of a four-lane highway 213. The image of the highway is captured by a wide-angle CCTV camera 202, which transmits the image to a wide-angle video monitor 203 where it is displayed as 215. The arrows (such as 200) which point outward from the illuminator indicate outgoing light. The arrows (such as 199) which point inward to the camera indicate the incoming light from the illuminated scene 211.

Referring to FIG. 11B, the light emitting manifold micro-diffractive illuminator 204 is shown illuminating a scene 212 consisting of a four lane highway 214. The image of the highway is captured collectively by four integrated specialized cameras, 205, 206, 207, 208. Cameras 205 and 206 work together to capture light represented by the downward arrows 210 and from the two leftmost lanes of the highway. One of these cameras may be optimized for daytime and the other optimized for nighttime. Alternatively, one of these cameras may be optimized for license plate image capture and the other optimized to capture images of the vehicle's driver or passengers. Cameras 207 and 208 are trained on the two rightmost lanes of the illuminated highway 214. They can be specialized in the same manner as cameras 205 and 206. The wide-angle light projected from the system onto a multi-lane roadway can be pulsed to synchronize with video input, of license plates or passengers in the vehicles traveling toward the system, to a wide-angle mega-pixel surveillance camera. The video input can then be processed by alphanumerics pattern recognition software in order to read license plate information of vehicles traveling on the roadway. The image of the wide, multi-lane highway 216 is shown correspondingly be displayed on a wide-angle monitor 217.

Figure 12B:
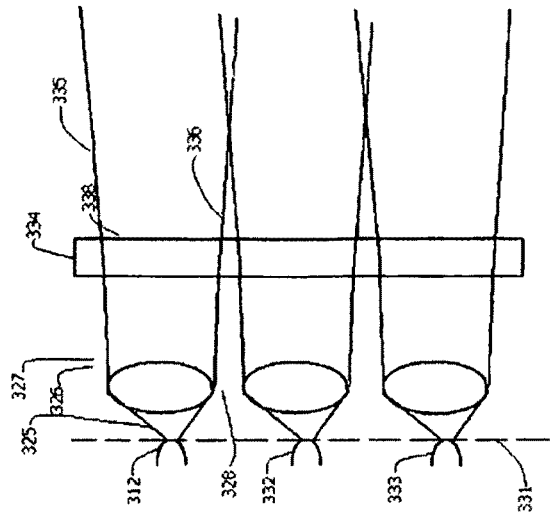
FIG. 12B is a side view of the section of the illuminator showing light rays from the light emitting manifold traveling through a spherical lens and narrowing before passing through the mono-directional micro-diffractive material with negligible vertical diffraction.
Figure 12A:
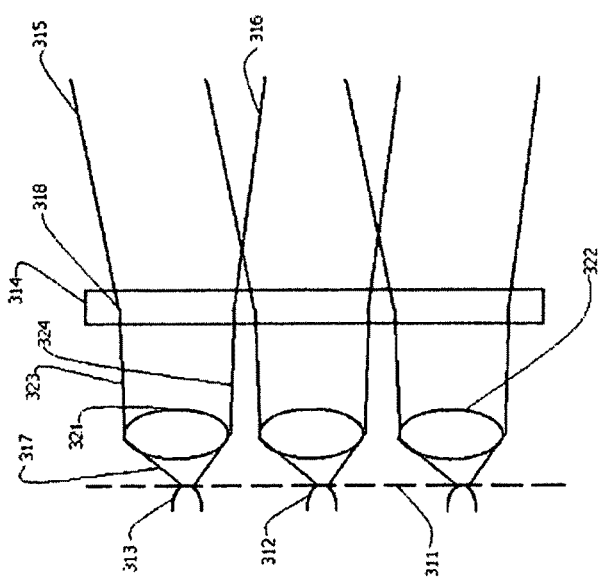
FIG. 12A is a top down view of a section of the illuminator showing light rays from the light emitting manifold traveling through a spherical lens and narrowing before passing through the mono-directional micro-diffractive material and being diffracted horizontally.

An array of surface mount LEDs with standard 120 degree circular illumination pattern can be combined with 6 degree spherical lens to produce narrow beams which are then directionally micro-diffracted. In FIG. 12A, the light emitting manifold 311 is seen in a top down view, containing a plurality of near point-source lights such as 312 and 313, sends rays of light such as 317 through spherical lenses such as 321 and 322 which causes them to narrow as at 323 and 324. The light rays then pass through a mono-directional micro-diffractive material 315 which causes the rays of light to diverge horizontally as at point 318, so that the outgoing light rays 315 and 316 travel out from the illuminator at greater angles. Referring to FIG. 12B, the light emitting manifold 331 is seen in a side view, with point-source light 312 shown at the top, and point-source lights 332 & 333 which are below the visible plane of FIG. 12A. Rays of light such as 325 from the manifold 331 pass through spherical lenses such as 326 which causes them to narrow as at 327 and 328. The light rays then pass through the micro-diffractive material 334, but the mono-directional nature of the micro-diffractive material enables the light to pass through without significant vertical divergence as a point 338. The outgoing rays of light such as 335 and 336 continue close to their pre-micro-diffractive material trajectories shown at 327 and 328.

The within-described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

What is claimed is:

1. A surveillance illuminator system in which a directional micro-diffractive material, comprising aligned nanoscopic refractive structures that refract more light and at a greater angle of divergence in a horizontal plane of illumination than in a vertical plane of illumination, is mounted in front of a light-emitting manifold, and in which the directional micro-diffractive material is further a sheet in which the aligned nanoscopic refractive structures statistically tend to refract light at a different angle in a horizontal plane than in a vertical plane.

2. The surveillance illuminator system of claim 1, in which the directional micro-diffractive material projects a horizontal divergence of light output in a range greater than double an angular divergence of a light source from a light source within the light-emitting manifold, and projects a vertical divergence of light output equivalent to the angular divergence of light output from the light source within the light-emitting manifold.

3. The surveillance illuminator system of claim 2, in which the directional micro-diffractive material projects a horizontal divergence of light output in a range from 2 to 13 times an angular divergence of light output of a light source within the manifold.

4. The surveillance illuminator system of claim 1, additionally comprising a surveillance camera having an aspect ratio sensitivity matching a light pattern projected by the directional micro-diffractive material mounted in front of the light-emitting manifold.

5. The surveillance illuminator system of claim 1, in which the light-emitting manifold comprises a multiplicity of LEDs in a planar array.

6. The surveillance illuminator system of claim 5, in which a front window for the light emitting manifold has optical filter properties that pass substantially all infrared light energy while blocking light at shorter wavelengths.

7. The surveillance illuminator system of claim 5, comprising a rectangular array of LEDs.

8. The surveillance illuminator system of claim 7, in which a planar, rectangular array of LEDs has a horizontal axis in a ratio of 16:14 to a vertical axis.

9. The surveillance illuminator system of claim 5, comprising a circular array of LEDs.

10. The surveillance illuminator system of claim 5, in which a ratio of horizontal to vertical angular spread by the directional micro-diffractive material of the light output distribution angle of the LEDs used in the planar array is greater than 2.

11. The surveillance illuminator system of claim 1, in which the manifold emits infrared light.

12. The surveillance illuminator system of claim 1, in which the directional micro-diffractive material projects a horizontal divergence of light output in a range greater than double an angular divergence of light output from a light source within the light-emitting manifold, and projects a vertical divergence of light output in a range less than the horizontal divergence of light output, and a light source within the light-emitting manifold is attached to a heat sink providing a thermal path to a back of an illuminator body.

13. The surveillance illuminator system of claim 1, in which the directional micro-diffractive material is attached with adhesive to a front face plate for the light emitting manifold.

14. The surveillance illuminator system of claim 1, in which the directional micro-diffractive material is formed and arranged such that it projects an elliptical Gaussian distribution of refracted light onto a target area.

15. The surveillance illuminator system of claim 14, in which a major axis of diffraction is in the horizontal plane.

16. The surveillance illuminator system of claim 14, in which the directional micro-diffractive material projects light having a full width at half maximum horizontal divergence of its Gaussian distribution in a range from 30 to 130 degrees.

17. The surveillance illuminator system of claim 14, in which the directional micro-diffractive material projects light having a full width at half maximum vertical divergence of its Gaussian distribution in a range from 6 to 12 degrees.

18. The surveillance illuminator system of claim 1, in which the directional micro-diffractive material is formed from one of a member of the class of polycarbonate, polyester, acrylic, or glass.

19. The surveillance illuminator system of claim 1, in which the directional micro-diffractive material is a horizontal diffuser.

20. The surveillance illuminator system of claim 1, in which the directional micro-diffractive material is an elliptical diffuser.

21. The surveillance illuminator system of claim 1, in which a second layer of micro-diffractive material is overlaid over a first layer of micro-diffractive material, the second layer having different diffractive properties than the first layer, such that the first layer and the second layer in combination projects a pattern that is more asymmetrical in its vertical aspect than its horizontal aspect.

22. The surveillance illuminator system of claim 1, in which a multiplicity of insertable optional layers of micro-diffractive material having different diffractive properties provides target illumination application versatility.

23. The surveillance illuminator system of claim 1, in which a planar, rectangular array of LEDs has center wavelength light output in the range of 700 to 1000 nanometers.

24. The surveillance illuminator system of claim 1, in which the illumination source is a single laser diode.

25. The surveillance illuminator system of claim 1, in which a planar array of LEDs is driven by constant current power source.

26. The surveillance illuminator system of claim 1, in which wide-angle light that is projected from the system onto a target area is pulsed to synchronize with video input from a target image within the target area to a wide-angle mega-pixel surveillance camera.

27. The surveillance illuminator system of claim 26, in which wide-angle light is projected from the system onto a roadway and video input to the surveillance camera is processed an alphanumerics pattern recognition module in order to read licence plate information of vehicles traveling on the roadway.

28. The surveillance illuminator system of claim 27, in which wide-angle light is projected from the system onto a multi-lane roadway and video input to the surveillance camera is processed by an alphanumerics pattern recognition module in order to read licence plate information of vehicles traveling toward the system in different lanes of the roadway.

29. The surveillance illuminator system of claim 1, in which the directional micro-diffractive material is a sheet comprising nanoscopic structure that statistically tends to refract light at a different angle in a horizontal plane than in a vertical plane.

30. The surveillance illuminator system of claim 29, in which wide-angle light is projected from the system onto a multi-lane roadway and is pulsed to synchronize with video input from licence plates on vehicles traveling toward the system to a wide-angle mega-pixel surveillance camera, and the video input is processed by an alphanumerics pattern recognition module in order to read licence plate information of vehicles traveling on the roadway.

31. The surveillance illuminator system of claim 1, in which multiple surveillance cameras are used to receive images from a wide-angle target area.

32. The surveillance illuminator system of claim 1, in which an array of LEDs with wide angle circular illumination is overlaid with an array of lenses to project narrower light beams into the mono-directional micro-diffractive material.

33. A surveillance illuminator system, in which:
a) a directional micro-diffractive material, comprising aligned nanoscopic refractive structures that allow less diffraction of light in a vertical plane than in a horizontal plane, is mounted in front of a light-emitting manifold below a mid-line of an illuminator;
b) a different micro-diffractive material above the mid-line of the illuminator along with the directional micro-diffractive material above the mid-line of the illuminator provides an asymmetrical vertical beam profile; and
c) the directional micro-diffractive material is further a sheet in which the aligned nanoscopic refractive structures statistically tend to refract light at a different angle in a horizontal plane than in a vertical plane.

34. A surveillance illuminator system in which:
a) a directional micro-diffractive material, comprising aligned nanoscopic refractive structures that refract more light and at a greater angle of divergence in a horizontal plane of illumination than in a vertical plane of illumination, is mounted in front of a light-emitting manifold;
b) the light-emitting manifold comprises a plurality of light sources as a planar array of infrared LEDs, attached to a heat sink providing a thermal path to a back of an illuminator body and driven by constant power source, the planar array of infrared LEDs having a wide angle circular illumination and being overlaid with an array of lenses to project narrower light beams into the directional micro-diffractive material;
c) the directional micro-diffractive material projects a horizontal divergence of light output in a range greater than double an angular divergence of a light output from each of the plurality of light sources within the light-emitting manifold, and projects a vertical divergence of light output in a range equivalent to the angular divergence of light output from each of the plurality of light sources within the light-emitting manifold;
d) a front window for the light emitting manifold has optical filter properties that pass substantially all infrared light energy while blocking light at shorter wavelengths;
e) the directional micro-diffractive material is further a sheet in which the aligned nanoscopic refractive structures statistically tend to refract light at a different angle in a horizontal plane than in a vertical plane; and
f) the directional micro-diffractive material is arranged such that it projects an elliptical Gaussian distribution of refracted light, having a major axis of diffraction in the horizontal plane and a horizontal divergence in a range greater than double the angular divergence of light output of planar array of infrared LEDs and a vertical divergence in a range equivalent to the angular divergence of light output from the planar array of infrared LEDs.

* * * * *